United States Patent
Tanimoto et al.

(10) Patent No.: US 9,671,893 B2
(45) Date of Patent: Jun. 6, 2017

(54) INFORMATION PROCESSING DEVICE HAVING TOUCH SCREEN WITH VARYING SENSITIVITY REGIONS

(71) Applicant: CASIO COMPUTER CO., LTD., Tokyo (JP)

(72) Inventors: Masanori Tanimoto, Tokyo (JP); Shigeki Uesaka, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 99 days.

(21) Appl. No.: 14/211,462

(22) Filed: Mar. 14, 2014

(65) Prior Publication Data
US 2014/0300559 A1    Oct. 9, 2014

(30) Foreign Application Priority Data
Apr. 3, 2013   (JP) .................................. 2013-077414

(51) Int. Cl.
*G06F 3/041*   (2006.01)
*G06F 3/0488*  (2013.01)
*G06F 3/0484*  (2013.01)

(52) U.S. Cl.
CPC .......... *G06F 3/0416* (2013.01); *G06F 3/0484* (2013.01); *G06F 3/04886* (2013.01); *G06F 2203/04803* (2013.01)

(58) Field of Classification Search
CPC ...... G06F 3/041; G06F 3/0416; G06F 3/0418; G06F 3/0484; G06F 3/0488; G06F 3/04886; G06F 2203/04803
See application file for complete search history.

(56) References Cited

U.S. PATENT DOCUMENTS

2006/0109252 A1   5/2006  Kolmykov-Zotov et al.
2009/0174679 A1*  7/2009  Westerman ......... G06F 3/03547
                                              345/173

(Continued)

FOREIGN PATENT DOCUMENTS

AU    2011369613 A1   11/2013
JP    2006-146936 A    6/2006

(Continued)

OTHER PUBLICATIONS

Japanese Office Action dated Mar. 24, 2016 in a counterpart Japanese patent application No. 2013-077414.

*Primary Examiner* — Keith Crawley
(74) *Attorney, Agent, or Firm* — Chen Yoshimura LLP

(57) ABSTRACT

The present invention aims at being able to prevent unintentional operation and to improve operating characteristics even if the entirety of a touch panel can be effectively used as a touch operating surface. Specifically, a touch control table that is a table storing thresholds set in accordance with regions on the touch screen is provided, and this touch control table has "Region" and "Threshold" as respective columns. A CPU detects a contact position and area of contact as contact states at the time of touch operation on the screen (touch screen) of a touch input display unit. The CPU identifies the touched region on the basis of the contact position, and thereafter compares the detected area of contact to the threshold set in accordance with the region. The CPU interprets the touch operation on the basis of the comparisons of the region.

9 Claims, 9 Drawing Sheets

(56) References Cited

U.S. PATENT DOCUMENTS

| | | | |
|---|---|---|---|
| 2009/0184935 A1* | 7/2009 | Kim | G06F 3/0488 345/173 |
| 2011/0248948 A1* | 10/2011 | Griffin | G06F 3/041 345/174 |
| 2012/0023459 A1 | 1/2012 | Westerman | |
| 2012/0249448 A1* | 10/2012 | Liu | G06F 3/04883 345/173 |
| 2012/0299856 A1* | 11/2012 | Hasui | G06F 3/0418 345/173 |
| 2012/0319959 A1* | 12/2012 | Saponas | G06F 3/0237 345/173 |
| 2013/0222286 A1* | 8/2013 | Kang | G06F 3/041 345/173 |
| 2013/0222287 A1* | 8/2013 | Bae | G06F 3/0416 345/173 |
| 2013/0234982 A1* | 9/2013 | Kang | G06F 3/0488 345/174 |
| 2015/0067602 A1* | 3/2015 | Bernstein | G06F 3/0488 715/823 |
| 2015/0067605 A1* | 3/2015 | Zambetti | G06F 3/0485 715/830 |
| 2015/0135109 A1* | 5/2015 | Zambetti | G06F 3/04817 715/767 |
| 2015/0160765 A1* | 6/2015 | Satou | G06F 3/04883 345/173 |

FOREIGN PATENT DOCUMENTS

| | | |
|---|---|---|
| JP | 2011-204092 A | 10/2011 |
| JP | 2012-248068 A | 12/2012 |
| WO | 2013/128911 A1 | 9/2013 |

* cited by examiner

3c Touch Control Table

| Region | Threshold |
|---|---|
| Control Region (Command Indicator Region) | Large |
| Control Region (Screen Edge Region) | Very Large |
| Whole Region | Small |

FIG. 6

INFORMATION PROCESSING DEVICE HAVING TOUCH SCREEN WITH VARYING SENSITIVITY REGIONS

This application claims the benefit of Japanese Application No. 2013-077414, filed in Japan on Apr. 3, 2013, which is hereby incorporated by reference in its entirety.

BACKGROUND OF THE INVENTION

Field of the Invention

The present invention relates to an information processing device having a touch screen with a touch panel attached thereto and to a program.

Description of Related Art

A technique that prevents unintentional operation around the touch panel in a conventional information processing device having a touch screen with a touch panel attached thereto is disclosed in Japanese Patent Document 1 (Japanese Patent Application Laid-Open Publication No. 2012-248068) and Patent Document 2 (Japanese Patent Application Laid-Open Publication No. 2011-204092), for example.

Namely, in Patent Document 1 a technique is disclosed in which touch is determined to have occurred if a region where a touch key is arranged has been touched for a certain amount of time or longer. Further disclosed in Patent Document 1 is a technique in which the entire touch panel is divided into a display region, a key region around the display region, and a detection region between these, and the pressing of a key is not processed if the user touches both the detection region and the key region. A technique is disclosed in Patent Document 2 in which it is possible to adjust the operable region of the touch panel.

However, a technique in which touch is determined to have occurred on the basis of a touch operation for a certain amount of time or longer, as described above, makes fast operation impossible. A control technique to invalidate a key operation when the user contacts both a key region and a detection region requires a custom detection region to be provided. Furthermore, a technique that makes it possible to adjust the operable region of the touch panel does not solve the problem of the effective operable region becoming smaller.

SUMMARY OF THE INVENTION

A problem of the present invention is to make it possible to prevent unintentional operation even if the entirety of the touch panel is capable of effectively being used as a touch operation screen, and to improve operating characteristics.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present invention is an information processing device provided with a touch screen having a touch panel attached thereto, including: a contact detector that detects a contact position and an area of contact when there is a touch operation on the touch screen; a region identifier that identifies a region on the touch screen that has been touched among a plurality of regions defined on the touch screen, the region being identified on the basis of the contact position detected by the contact detector; and a controller that compares an area of contact detected by the contact detector to a threshold set in accordance with the region on the touch screen when the region is identified by the region identifier, the controller interpreting the touch operation on the basis of this comparison.

According to the present invention, it possible to prevent unintentional operation even if the entirety of the touch panel is capable of effectively being used as a touch operation screen, and to substantially improve operating characteristics.

It is to be understood that both the foregoing general description and the following detailed description are exemplary and explanatory, and are intended to provide further explanation of the invention as claimed.

BRIEF DESCRIPTION OF THE DRAWINGS

FIG. 6 is a view for explaining a touch control table 3c.

DETAILED DESCRIPTION OF THE PREFERRED EMBODIMENTS

Embodiments of the present invention will be explained below with reference to FIGS. 1 to 9.

Figure 1:
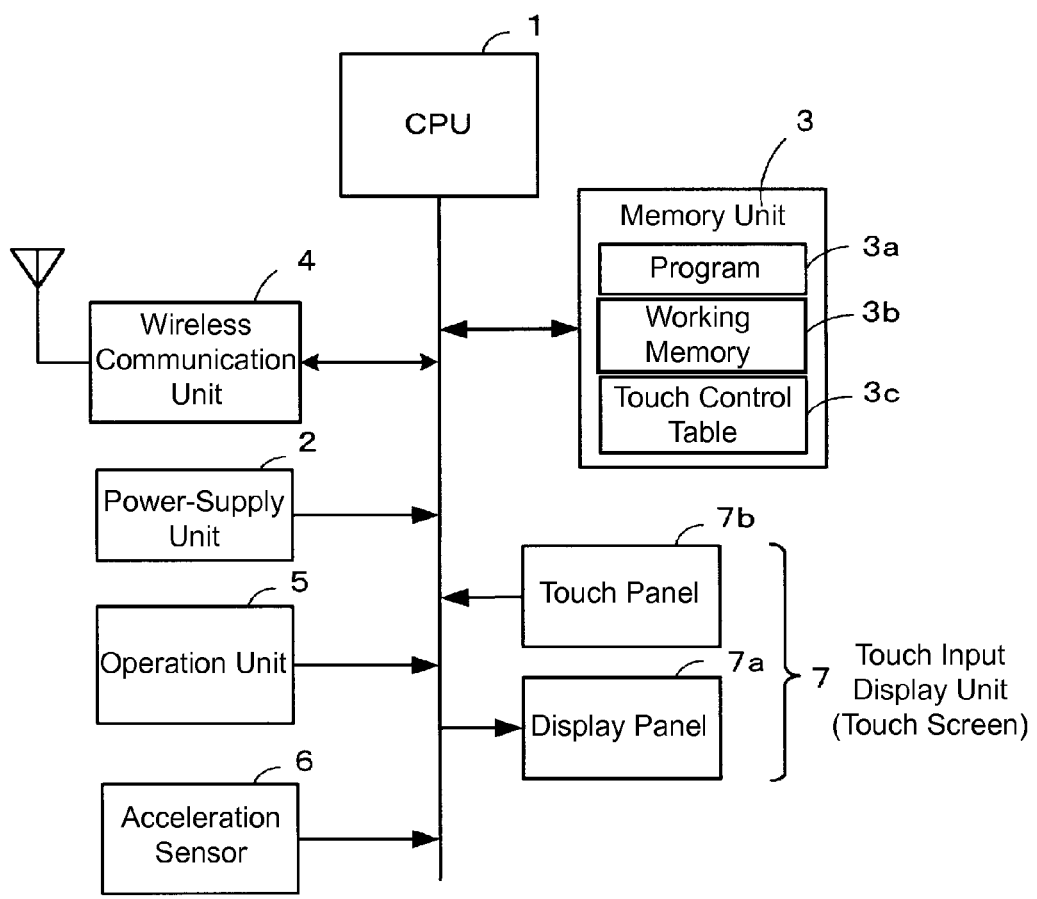
FIG. 1 is a block diagram showing basic constituting elements of a portable terminal device (smartphone) used as an information processing device.

The present embodiment is applied to a portable terminal device (a smartphone, which is a multi-functional portable phone) as an information processing device, for example, and FIG. 1 is a block diagram showing basic constituting elements of this portable terminal device (smartphone).

The casing of the portable terminal device (smartphone) has a thin rectangular body as a whole, and has basic functions such as calling, electronic mail, internet connection, a touch function provided with a touch screen having a touch panel attached thereto, and an attitude detecting function that detects the attitude of the device (the attitude of the casing). The core of the portable terminal device is a CPU 1.

The CPU 1 is a central processing unit that operates on power supplied from a power-supply unit 2, which is provided with a rechargeable battery (not shown), and the CPU 1 controls all operations of the portable terminal device in accordance with various types of programs in a memory unit 3. A program memory 3a, working memory 3b, and a touch control table 3c or the like described later for interpreting touch operation are provided in the memory unit 3.

Figure 7:
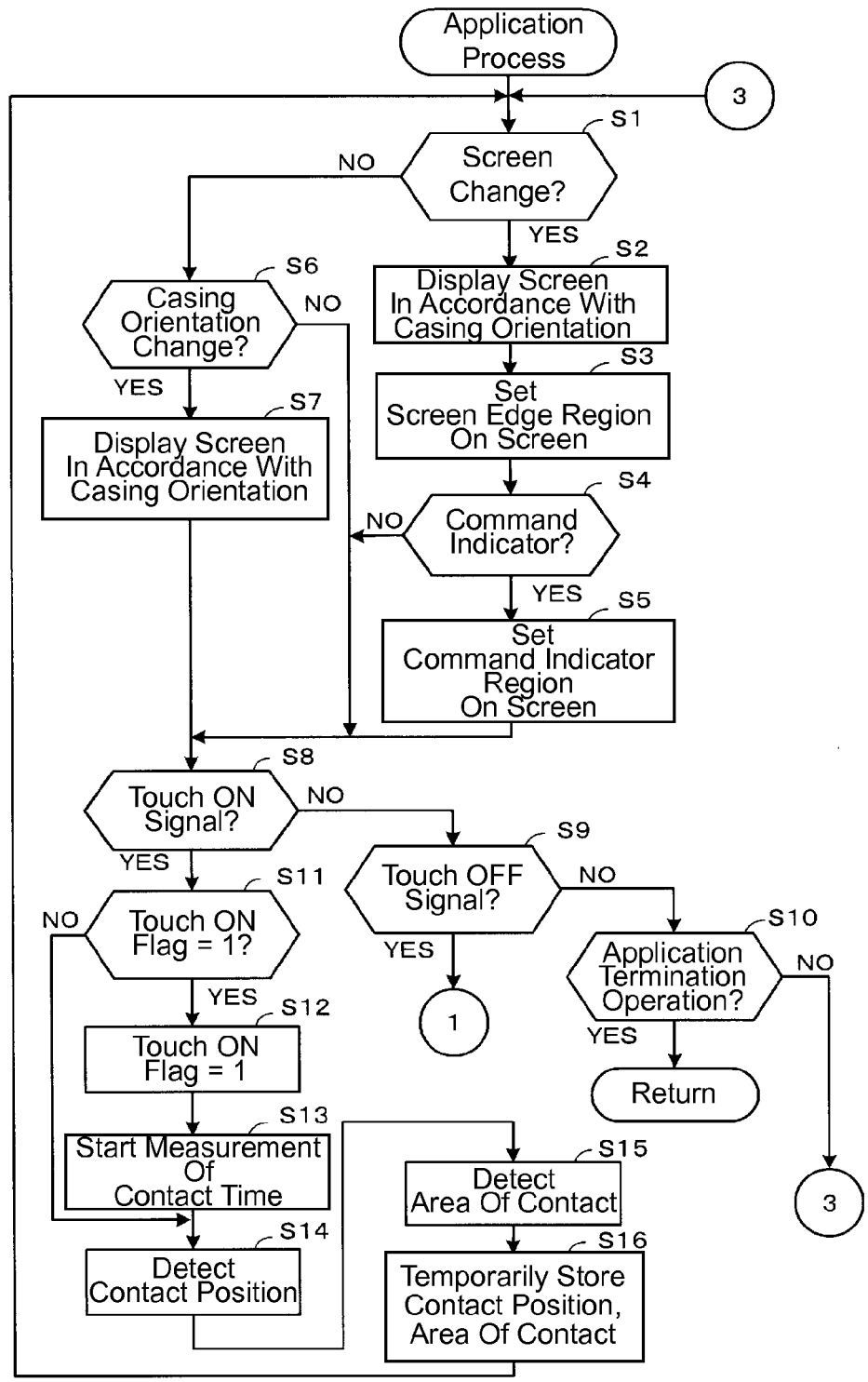
FIG. 7 is a flow chart where execution begins in accordance with the start of an application process.
Figure 8:
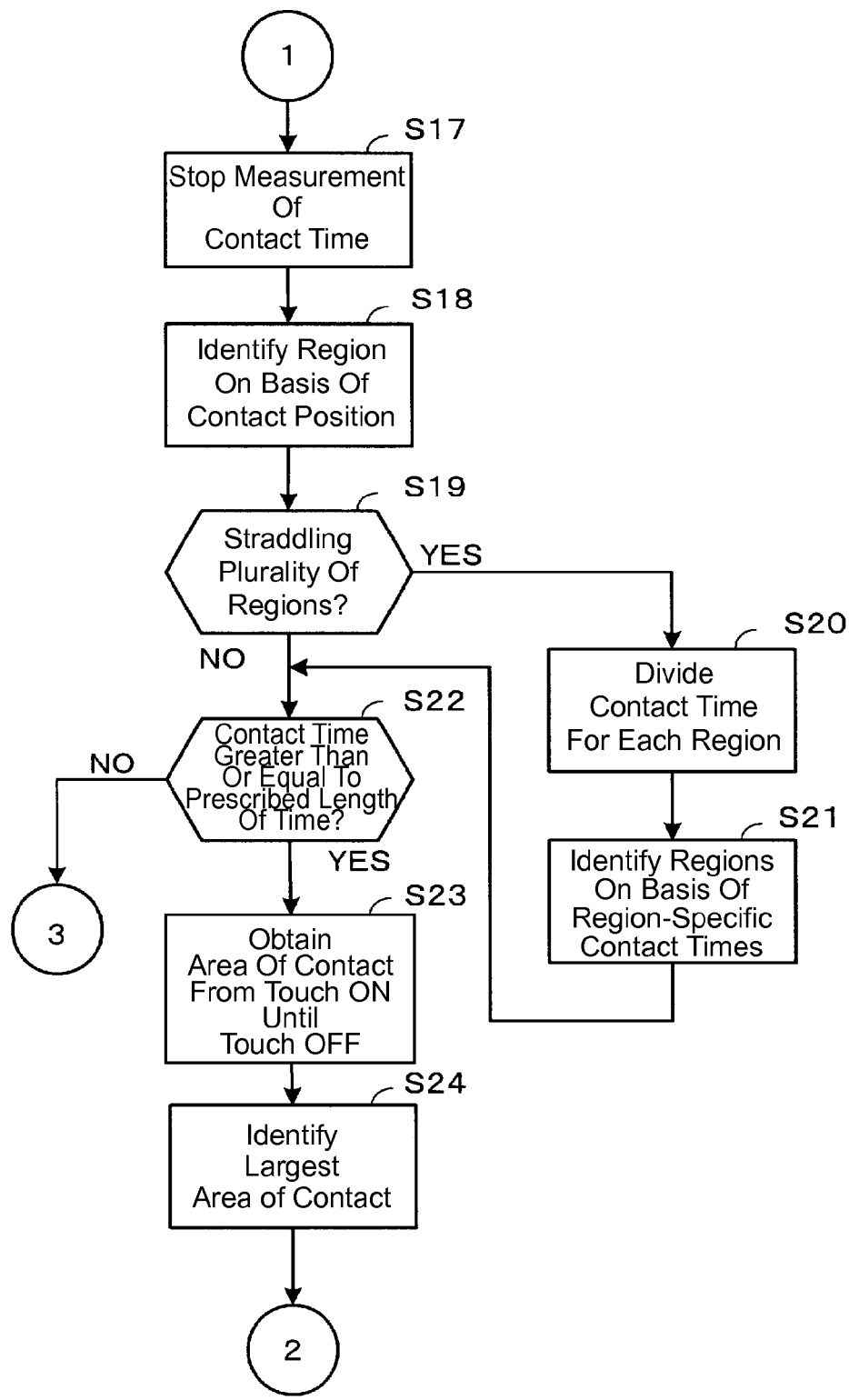
FIG. 8 is a flow chart continuing the operation in FIG. 7.
Figure 9:
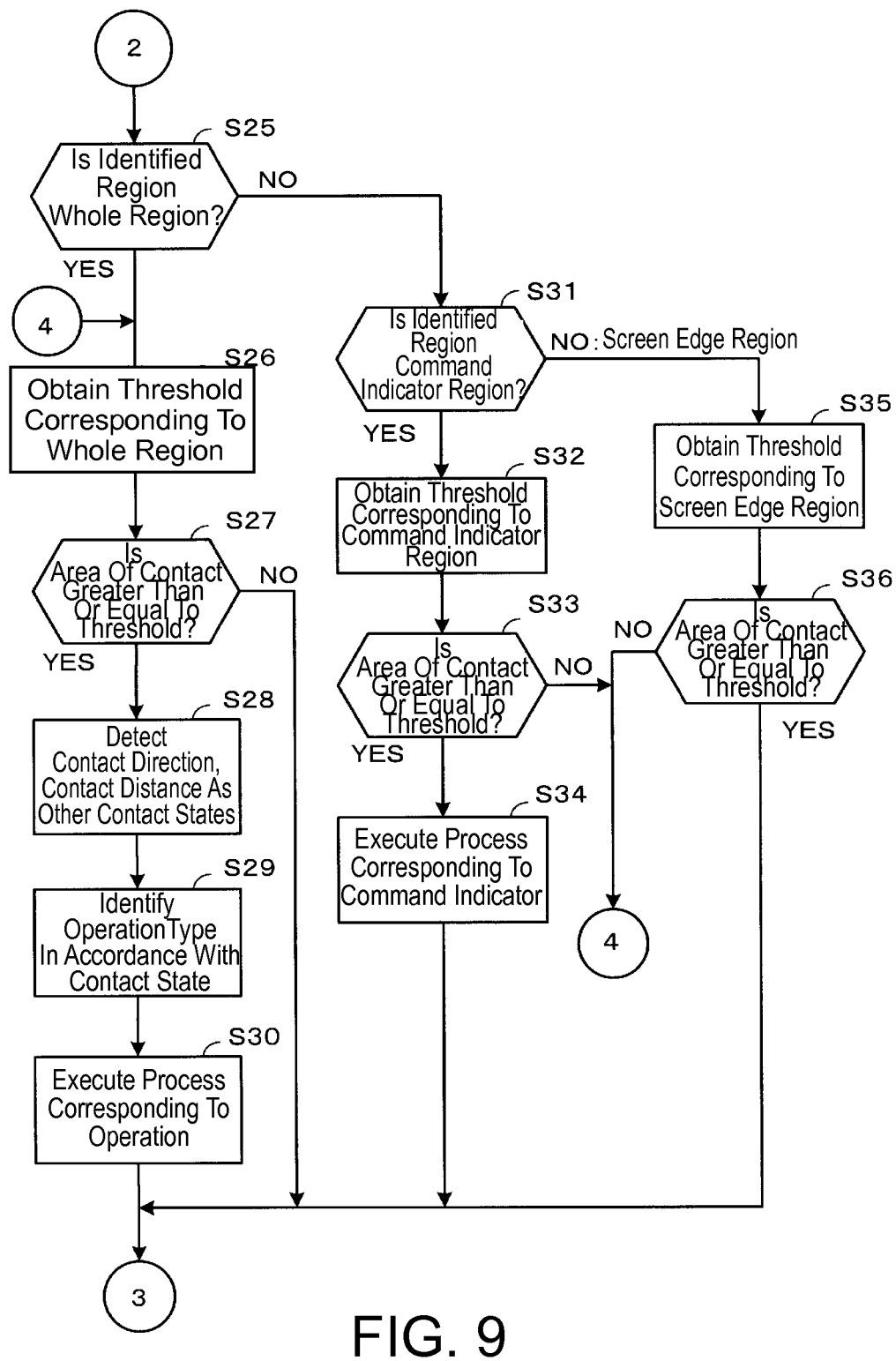
FIG. 9 is a flow chart continuing the operation in FIG. 8.

The program memory 3a stores programs, various types of applications, and the like for realizing the present embodiment in accordance with the operating procedure shown in FIGS. 7 to 9, and also stores necessary information and the like for this. The working memory 3b is a working area that temporarily stores various types of information (flags, timers, and the like, for example) necessary for the portable terminal device to operate.

The memory unit 3 may include a portable removable memory (recording medium) such as an SD card, an IC card, or the like, for example, a part of which may include a prescribed external server area (not shown).

A wireless communication unit 4 is a wide area wireless unit used during voice communication, electronic mail, and internet connection functions, and connects to other phones (not shown) through a mobile communication network and to other terminal devices through the internet (not shown). An operation unit 5 has various types of push-button keys such as a power button. An acceleration sensor 6 is an attitude detector that detects if the attitude of the casing (itself) is horizontal or vertical, for example.

A touch input display unit 7 is an input display device having a touch screen, having a touch panel 7b that is stacked on top of a display panel 7a. The touch input display unit 7 allocates various types of software keys (touch keys) and displays the respective function names thereof, and senses touch by a finger or the like in order to input an operation signal corresponding to the touch operation.

The display panel 7a is a liquid crystal panel that has a rectangular shape as a whole, and the screen (hereinafter, the touch screen) of the touch input display unit 7 becomes vertically long or horizontally long in accordance with the orientation of the casing. The touch panel 7b is of a capacitive type or a resistive type, for example, but other types may be adopted.

In the present embodiment, it is possible to detect, as touch operations on the touch panel 7b, a tap operation in which any position is touched and then immediately released, a flick operation in which contact is made and then immediately released, and a pinch-in/pinch-out operation in which zoom-in/zoom-out is indicated with two fingers. Without being limited thereto, operations such as a double-tap operation, swipe operation, and drag operation may also be detectable.

The touch input display unit 7 sends a signal (touch ON signal/touch OFF signal) indicating the presence or absence of contact in accordance with touch operations on the touch panel 7b to the CPU 1. The CPU 1 detects the coordinate position (contact position), area of contact, contact direction, contact distance, and contact time on the touch panel 7b as contact states on the basis of contact presence signals (touch ON signals/touch OFF signals) from the touch panel 7b.

The coordinate position (contact position) and area of contact may be detected by the touch input display unit 7, and the contact direction, contact distance, and contact time may be detected by the CPU 1. The CPU 1 identifies what type of touch operation has been performed on the basis of the contact state at the time of this touch operation, and a process corresponding to the touch operation is interpreted.

This type of contact state detection is a commonly used technique and the present embodiment uses this well-known technique; therefore, a specific explanation thereof will be omitted.

The above-mentioned touch operation is not limited to contact operations in which a finger or pen directly touch the touch panel 7b; a proximity operation in which the position of a finger or a pen is detected in accordance with a change in capacitance, a change in brightness, or the like according to the proximity or proximate movement of the finger or pen is included as an operation that is similar to the contact operation above, for example. In other words, without being limited to a contact touch panel that detects contact operation, the present invention may include a proximate touch panel or device, but in the present embodiment a contact operation on a contact touch panel is shown as a touch operation as an example.

FIG. 2 is an external perspective view of a portable terminal device (smartphone).

Figure 2A:
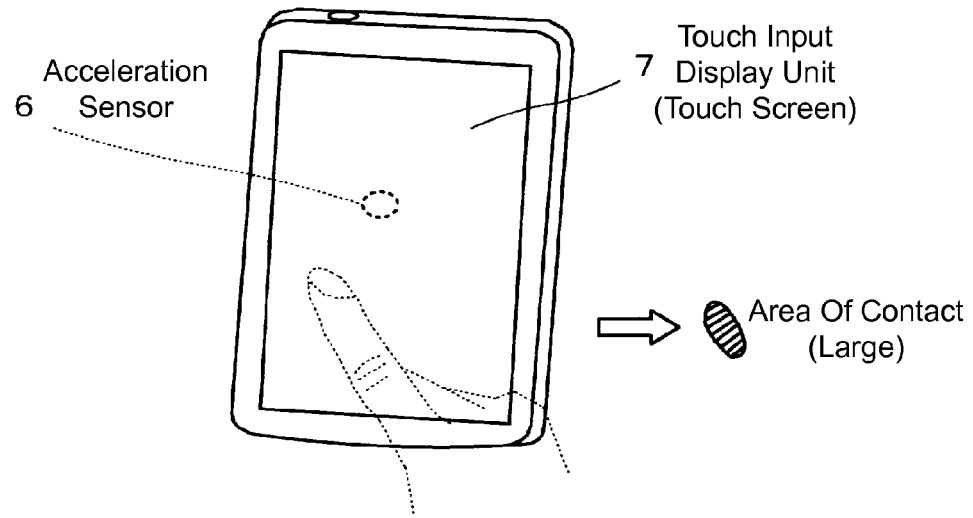
FIG. 2A is an external perspective view of the portable terminal device (smartphone) showing an example of a touch operation.
Figure 2B:
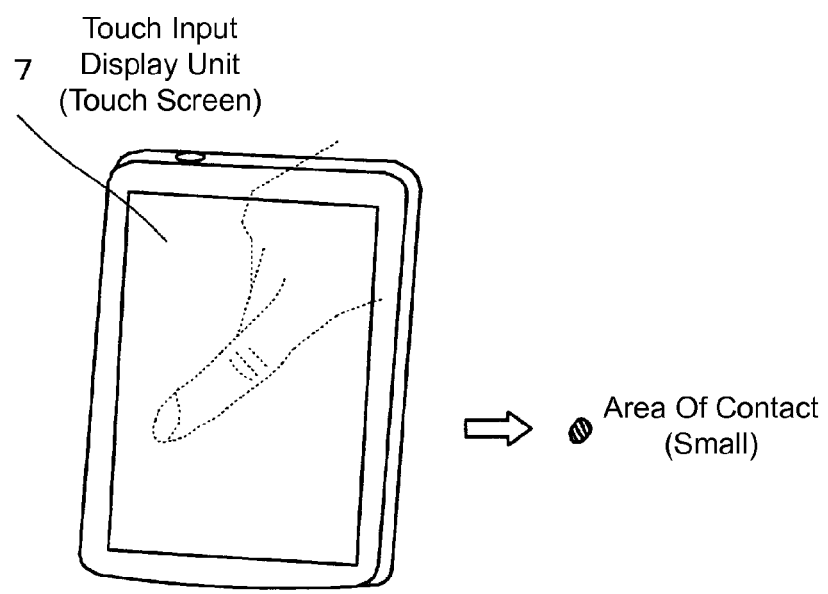
FIG. 2B is an external perspective view of the portable terminal device (smartphone) showing another example of a touch operation.

FIG. 2A shows a state in which a finger is laid on the touch input display unit 7 and the finger pad is touching the touch input display unit 7 as a touch operation. FIG. 2B shows a state in which a finger is pointed towards the screen and the tip of the finger is touching the screen.

The area of contact (touch area) between the finger and the touch screen varies greatly depending on the method of touch operation (method of contact). The area of contact in FIG. 2A is approximately four times the area of contact in FIG. 2B, for example.

The area of contact between the finger and the touch screen differs depending on the strength (pressing force) of the touch, and strongly pressing the finger or making the finger flat will increase the area of contact.

Figure 3A:
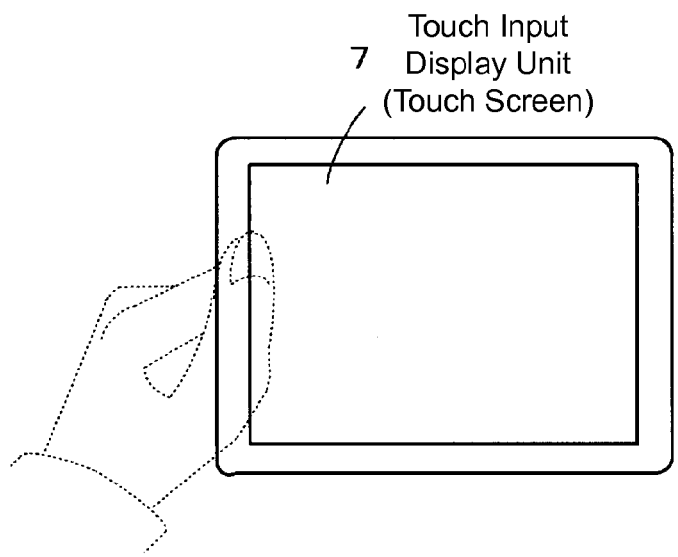
FIG. 3A is a view showing a state in which the casing is being held by one hand (one edge of the casing being held between the thumb and index finger of one hand).

FIG. 3A is a view showing a state in which a casing is being held by one hand (one edge of the casing being held between the thumb and index finger such that the orientation of the thin rectangular casing is horizontally long), and the touch screen is horizontally long in accordance with the orientation of the casing. When the edge (the left edge shown in the example) of the casing is gripped (held) in this manner between the thumb and index finger of one hand, a large portion of the thumb of the left hand enters the touch screen on the left edge of the casing.

Figure 3B:
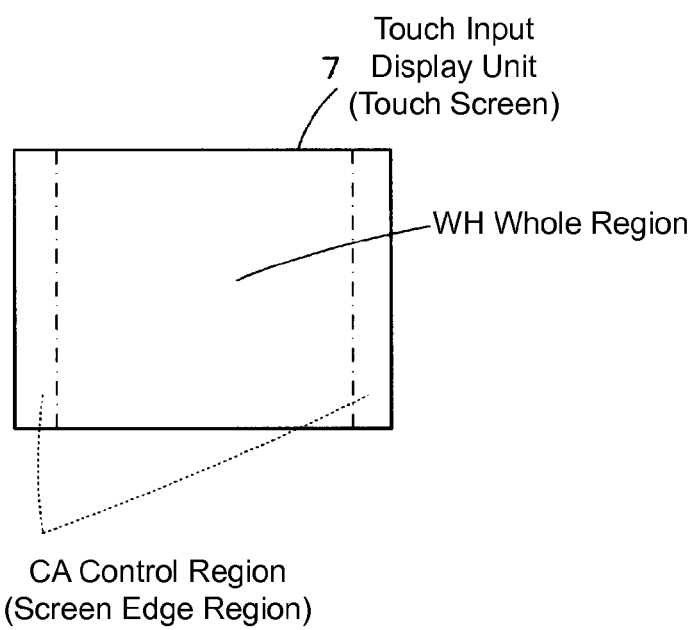
FIG. 3B is a view showing a state in which the left and right edges of the touch screen are set as control regions (screen edge regions) CA.

In the present embodiment, in order for the device to recognize that the contact when the casing is gripped in this manner is an unintentional operation, as shown in FIG. 3B the left and right edge regions (stripe-like regions) of the touch screen are each set to be identified regions, or namely, control regions CA.

The control regions (screen edge regions) CA are regions within a whole region WH that extends over substantially the whole touch screen. When the CPU 1 detects a contact (touch operation) in the control regions (screen edge regions) CA, the touch operation is interpreted (as a valid or invalid touch operation, for example) on the basis of whether the area of contact is greater than a prescribed threshold.

In other words, contact on the edge of the touch screen by the casing being gripped significantly increases the area of contact, and in the present embodiment, if the area of contact is greater than or equal to a prescribed threshold, the contact is determined to be an unintentional contact by the gripping of the case and this contact (touch operation) is determined to be invalid. However, if the area of contact on the edge of the touch screen is below the prescribed threshold, it is determined to be a touch operation on the whole region WH.

As shown in the drawings, an example is shown in which the control regions CA being set on the left and right edges of the touch screen, but only one of either the left or right edge may be set as the control region CA through user operations. A user who always grips the left edge of the casing with the left hand may set only the left edge of the touch screen as the control region CA, for example. Conversely, a user who always grips the right edge of the casing with the right hand may set only the right edge of the touch screen as the control region CA, for example.

Figure 4A:
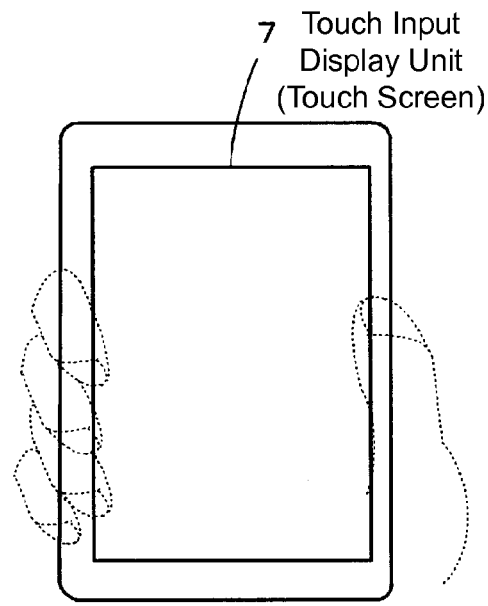
FIG. 4A is a view showing a state in which the casing is being held by one hand (being gripped in the palm of one hand).

FIG. 4A is a view showing a state in which the casing is being held by one hand (being gripped in the palm of one hand such that the thin rectangular casing is vertically long), and the touch screen is vertically long in accordance with the orientation of the casing. When both edges of the casing are gripped in one hand (the right hand, for example), a large portion of the respective fingers of the hand enter the touch screen of the left and right edges of the casing.

Figure 4B:
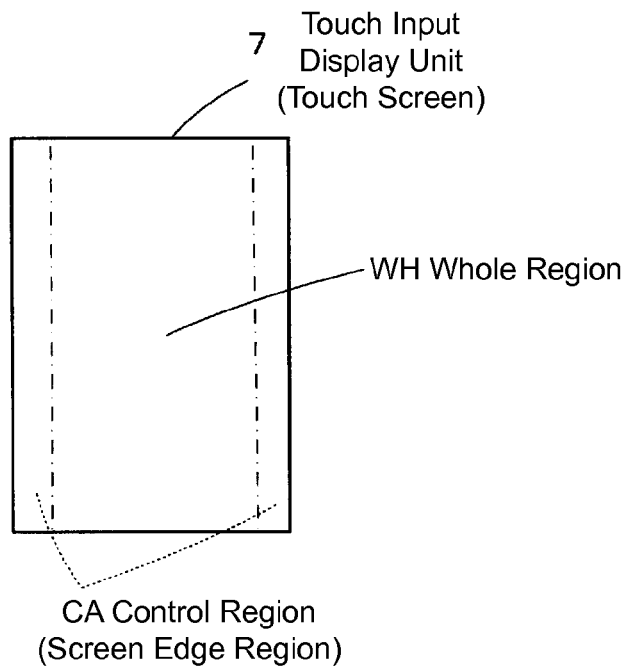
FIG. 4B is a view showing a state in which the left and right edges of the touch screen are set as control regions (screen edge regions) CA.

In the present embodiment, in order for the device to recognize that the contact when the casing is gripped in this manner is an unintentional operation, as shown in FIG. 4B, the left and right edges of the touch screen are each set to be the control regions CA.

Figure 5:
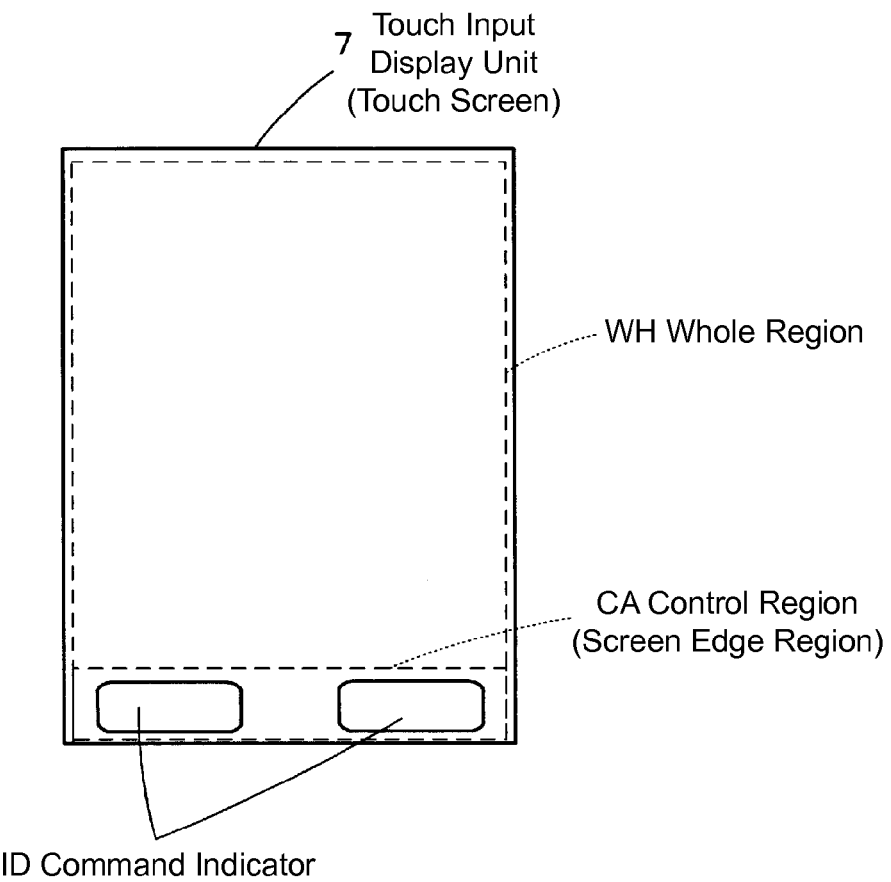
FIG. 5 is a view showing a state in which the control region (command indicator region) CA is set within the application screen shown on a touch input display unit 7.

FIG. 5 is an example showing an application screen (touch screen) displayed on the touch input display unit 7 by starting an arbitrarily selected application.

A plurality of command indicators ID are included at the bottom edge of the application screen, and the command indicator region that contains this plurality of command indicators ID is set as the control region CA. The command indicator ID is an operable icon, button, or the like that is an indication for a command to open a file, start software, or the like.

This control region (command indicator region) CA is a region within the whole region WH that extends over substantially the whole touch screen, in a manner similar to the above-mentioned control regions (screen edge regions) CA. When the CPU 1 detects a contact (touch operation) in the control region (command indicator region) CA, the touch operation is interpreted (as a valid or invalid touch operation, for example) on the basis of whether or not the area of contact is greater than a prescribed threshold.

In the example shown in the drawing, a page return button, a next page button, or the like, for example, are arranged in the control region (command indicator region) CA as the two command indicators ID. When a touch operation is performed on the control region (command indicator region) CA, if the area of contact is greater than or equal to a prescribed threshold, the CPU 1 issues a command to execute a process corresponding to the respective command indicators as a response to the touch operation on the respective command indicators ID. However, if the area of contact is below the prescribed threshold, the touch operation on the control region CA is determined to be invalid and is determined to be a touch operation on the whole region WH instead.

In the example shown in the drawing, the control region (command indicator region) CA was shown as being set on the bottom edge of the application screen, but the size, position, shape, number, and the like of the command indicator region will change in accordance with the application.

FIG. 6 is a view for explaining a touch control table 3c.

The touch control table 3c is a table that stores a prescribed threshold set in accordance with the region on the touch screen, and has respective columns "Region" and "Threshold." "Control Region (Screen Edge Region)," "Control Region (Command Indicator Region)," and "Whole Region" are set in the "Region" column.

There are three levels of thresholds set in the "Threshold": "Large," "Very Large," and "Small." In this case, "Very Large" is set in the "Threshold" of the "Control Region (Screen Edge Region)," "Large" is set in the "Threshold" of the "Control Region (Command Indicator Region)," and "Small" is set in the "Threshold" of the "Whole Region." The size of the thresholds of these is "Small"<"Large"<"Very Large." The relationship and value between "Region" and "Threshold" can be freely set by user operation.

As such, in the present embodiment the information processing device (smartphone) includes a touch screen (touch input display unit 7) with a touch panel attached thereto, and has: a contact detector (CPU 1, program memory 3a, touch input display unit 7) that detects the contact position and area of contact at the time of a touch operation on the touch screen; a region identifier (CPU 1, program memory 3a) that identifies the region on the touch screen among the plurality of regions (control region (screen edge regions) CA, control region (command indicator region) CA, whole region WH) on the touch screen that has been touched on the basis of the contact position detected by the contact detector; and a controller (CPU 1, program memory 3a, touch control table 3c) that, when the touched region has been identified by the region identifier, compares the area of contact detected by the contact detector to the threshold set in accordance with the region and interprets the touch operation on the basis of the comparison of the region.

Next, the operating concept of the information processing device (smartphone) in the present embodiment will be explained with reference to the flowcharts shown in FIGS. 7 to 9. The respective functions listed in these flowcharts are stored as a readable program code and operations according to the program code are executed consecutively. It is also possible to consecutively execute operations following the above-mentioned program code that has been transmitted through a transmission medium such as a network. In other words, in addition to the recording medium, it is possible to execute the operations of the present embodiment using a program/data externally supplied through a transmission medium. FIGS. 7 to 9 are flowcharts showing the operating overview of the characteristics of the present embodiment among the entire operation of the information processing device (smartphone). When the flowcharts in FIGS. 7 and 8 are completed, the CPU returns to the main flow (not shown) of the entire operation.

FIGS. 7 to 9 are flowcharts in which execution begins in accordance with the start of an application process.

First, the CPU 1 detects if the screen has changed (when the screen is switched or when scrolling) (step S1 in FIG. 7); during the start of the application the screen changes and displays an initial screen (YES in step S1). Thus, the CPU transitions to step S2, and a vertically long or horizontally long application screen (touch screen) is displayed on the touch input display unit 7 in accordance with the orientation of the casing detected by the acceleration sensor 6. If the orientation of the casing is vertically long, then the application screen (touch screen) also becomes vertically long, and if the orientation of the casing is horizontally long, then the application screen (touch screen) also becomes horizontally long. As shown in FIGS. 3 and 4, the left and right edges of the application screen are respectively set as the control regions (screen edge regions) CA (step S3).

Next, the CPU detects whether the command indicators ID such as icons, buttons, or the like are included in this application screen (step S4), and if the command indicators ID are included (YES in step S4), then as shown in FIG. 5 the region including the command indicators ID is set as the control region (command indicator region) CA (step S5). FIG. 5 shows two command indicators ID aligned in parallel in the control region (command indicator region) CA as an example. On the other hand, if not during a screen change (NO in step S1), then the CPU detects whether the orientation of the casing has changed on the basis of the detection results of the acceleration sensor 6 (step S6), and when the orientation of the casing has changed (YES in step S6) a vertically long or horizontally long application screen is displayed on the touch input display unit 7 in accordance with the orientation of the casing detected by the acceleration sensor 6.

When the application screen (touch screen) is displayed in this way, the CPU detects whether a touch ON signal (contact presence signal) has been received from the touch input display unit 7 (step S8), whether a touch OFF signal (contact absence signal) has been received from the touch input display unit 7 (step S9), and whether an operation that issues a command to terminate the application has been performed (step S10). When the respective steps S8, S9, and S10 are identified as "NO" at this time, the CPU returns to step S1. When a command to terminate the application is issued (YES in step S10), the flowcharts in FIGS. 7 to 9 are completed, but when a touch ON signal is received from the touch input display unit 7 due to contact on the touch screen (YES in step S8), then the CPU transitions to the below touch ON processes (steps S11 to S16).

In other words, in order to show a touch ON state (contact state), a touch ON flag (drawing omitted) becomes "1" (step S12) and a measuring operation of a contact time timer (drawing omitted) that obtains the contact time is initialized (step S13). The coordinate position (contact position) on the touch screen is detected on the basis of the touch ON signal (step S14), the area of contact at that region is detected (step S15), and this contact position and area of contact are temporary stored in the working memory 3b (step S16). Below, the CPU returns to the above-mentioned step S8, and if touch ON signals are continuously received while in touch ON (YES in step S8), then the touch ON processes mentioned above are repeated (steps S11 to S16).

When the finger moves away from the touch screen and a touch OFF signal (contact absence signal) is received from the touch input display unit 7 (YES in step S9), then the CPU transitions to the flow in FIG. 8, and the above-mentioned measuring operation of the contact time timer is halted (step S17). Thereafter, an region identification process is performed that identifies which region on the application screen has been contacted on the basis of the chronological contact positions (the contact positions from touch ON to touch OFF) that have been sequentially stored in the working memory 3b from contact presence during touch operation initialization until contact absence during touch operation termination (step S18). In this case, if the chronological contact positions are all on the same region, then a single region can be identified, but if the contact positions straddle a plurality of regions, then a single region cannot be identified.

Therefore, the CPU detects whether the touch operation straddled a plurality of regions, or namely, whether there are a plurality of identified regions (step S19). If the touch operation straddled a plurality of regions (YES in step S19), then all the contact times measured by the above-mentioned contact time timer are divided into a plurality of regions on the basis of the contact positions from touch ON until touch OFF (step S20). If the proportion contacting the respective regions is 2 to 1, then all the areas of contact are divided into 2 to 1, for example. By comparing the length of the contact time depending on the region, a single region is identified on the basis of which region was contacted the longest (step S21).

After the region is identified in this manner, the CPU transitions to step S22 and detects whether the entire contact time measured by the contact time timer is greater than or equal to a prescribed time. In the present embodiment, the prescribed time is a time for identifying whether the contact was an intentional operation or whether the contact was an unintentional operation (a time for seeking the intention of the operation of the user). This time is a ½ second, for example, but is not limited thereto. If the entire contact time is below the prescribed time (NO in step S22), then the operation is determined to be an unintentional operation, and the CPU transitions to step S1 in FIG. 7 in order to ignore this operation. However, if the entire contact time is greater than or equal to the prescribed time (YES in step S22), then the CPU reads the chronological areas of contact (the areas of contact from touch ON until touch OFF) temporarily stored in the working memory 3b (step S23) and identifies the largest value therefrom as the optimal value (step S24).

Thereafter, the CPU transitions to the flow in FIG. 9 and detects whether the above-mentioned identified region is on the whole region WH (step S25), or on the control region (command indicator region) CA (step S31). If the identified region is on the whole region WH (YES in step S25), or in other words, a touch operation on the whole region WH, then the CPU reads the "Threshold" corresponding to the "Whole Region" from the touch control table 3c (step S26) and then detects whether the largest value of the area of contact is greater than or equal to the threshold by comparing the optimal value (largest value) of the area of contact identified in step S24 to the threshold (step S27).

In this case, as shown in FIG. 6 the "Threshold" corresponding to the "Whole Region" is "Small," and thus, the area of contact will be determined to be greater than or equal to the threshold even if the whole region WH of the application screen is touched (lightly touch) with a small pressing force, even if the screen is touched by a fingertip, or in other words, even if the touch operation is an operation with a small area of contact (YES in step S27). If the area of contact is too small and below the threshold (NO in step S27), then the touch on the whole region WH will be determined to be an unintentional operation and the CPU will return to step S1 in FIG. 7.

If the area of contact is greater than or equal to the threshold at the time of touch operation on the whole region WH, then the touch operation is determined to be an intentional operation (YES in step S27), and the CPU transitions to step S28. After the contact direction, contact distance, and the like are detected as other contact states, the operation type (tap, flick, pinch-in/pinch-out) is identified on the basis of contact states such as this contact position, contact direction, and contact distance (step S29). The CPU returns to step S1 in FIG. 7 after a command to execute a process corresponding to the operation type is issued (step S30).

On the other hand, if the identified region is an command indicator region (YES in step S31), or in other words, a touch operation on the command indicator region, then the CPU reads the "Threshold" corresponding to the "Command Indicator Region" from the touch control table 3c (step S32), and then detects whether the largest value of the area of contact is greater than or equal to the threshold by comparing the optimal value (largest value) of the area of contact identified in step S24 to the threshold (step S33). In this case, as shown in FIG. 6 the "Threshold" corresponding to the "Command Indicator Region" is "Large," and thus, the user is performing a touch operation so that the area of contact will become larger rather than touching the whole region WH of the application screen. When the area of contact is greater than or equal to the threshold value in this way (YES in step S33), then the CPU transitions to step S34, and a command is issued to execute a process corresponding to the touched command indicator ID. The a command to open a file or start a software is issued, for example. Thereafter, the CPU returns to step S1 in FIG. 7.

If the area of contact at the time of touch operation on the command indicator region is below the threshold (NO in step S33), then it is determined that the touch operation is not aimed at the command indicator region but is rather a touch operation on the whole region WH that covers the command indicator region. Thereafter, the CPU transitions to step S26, obtains the "Threshold" corresponding to the "Whole Region" from the touch control table 3c, and performs the above-mentioned operations (steps S28 to S30) if the area of contact is greater than or equal to the threshold (YES in step S27).

If the identified region is neither the whole region WH nor the command indicator region (NO in step S25 and step S31), then the touch operation is determined to be on the screen edge regions. Thereafter, the CPU transitions to step S35, reads the "Threshold" corresponding to the "Screen Edge Region" from the touch control table 3c, and then detects whether the largest value of the area of contact is greater than or equal to the threshold by comparing the optimal value (largest value) of the area of contact identified in step S24 to the threshold (step S36). In this case, as shown in FIG. 6 the "Threshold" corresponding to the "Screen Edge Region" is "Very Large," and when fingers contact the edges of the touch screen while the casing is gripped, the area of contact becomes very large; thus, if the area of contact is greater than or equal to the prescribed threshold (YES in step S36), the operation is determined to be contact due to gripping of the case, and the CPU returns to step S1 in FIG. 7 in order to invalidate the contact (touch operation) thereof.

If the area of contact at the time of touch operation on the screen edge regions is below the threshold (NO in step S36), then the touch operation is determined to be aimed at the whole region WH, and the CPU transitions to step S26 and obtains the "Threshold" corresponding to the "Whole Region" from the touch control table 3c. If the area of contact is greater than or equal to the threshold (YES in step S27), then the CPU performs the above-mentioned operations (steps S28 to S30), but if the area of contact is too small and below the threshold (NO in step S27), then the touch on the screen edge regions is determined to be an unintentional operation and the CPU returns to step S1 in FIG. 7.

As described above, in the present embodiment the CPU 1 detects the contact position and area of contact as contact states at the time of touch operation on the screen (touch screen) of the touch input display unit 7 and identifies the touched region on the basis of this contact position. Thereafter, the CPU 1 compares the detected area of contact to the threshold value set in accordance with the region and interprets the touch operation on the basis of the comparisons of the region; therefore, it is possible to prevent unintentional operation and achieve a substantial improvement in operation characteristics without decreasing the effective operable region of the touch panel 7b, as in conventional devices, and even if the entirety of the touch panel is able to be effectively used as the touch operation screen.

At the time of touch operation on the control region (command indicator region) CA, if the area of contact is greater than the threshold when comparing the area of contact and the threshold of the command indicator region CA, then a command to execute a process to validate the touch operation on the command indicator region is issued; therefore, at the time of the touch operation on the command indicator region the user can make clear their intention of touching the command indicator region by merely touching it such that the area of contact becomes larger rather than touching the whole region WH, thereby making it possible to issue a command to execute a process corresponding to the command indicator ID in the command indicator region.

At the time of touch operation on the command indicator region, if the area of contact is smaller than the threshold corresponding to the command indicator region but larger than the threshold corresponding to the whole region WH, then a command will be issued to execute a process corresponding to the whole region WH instead of a process corresponding to the command indicator region; therefore, even if the command indicator region is arranged on the touch screen, the entirety of the touch screen can be used as the whole region WH, and the differentiation between a touch operation on the whole region WH and a touch operation on the command indicator region can be performed with ease for the user.

If the area of contact is larger than the threshold corresponding to the screen edge regions at the time of touch operation on the control region (screen edge regions) CA, then the touch operation on the screen edge regions is determined to be invalid; thus, unintentional operation due to gripping of the casing can be avoided even if a finger contacts the edge of the touch screen while the casing is being gripped.

A plurality of areas of contact are detected from contact presence during touch operation initialization until contact absence during touch operation termination, and the largest value determined on the basis of this plurality of areas of contact is detected as the area of contact at the time of touch operation; therefore, the optimal area of contact can be detected. An area of contact that is small at the time of touch operation initialization will gradually become larger, and even if the area of contact becomes smaller thereafter, the optical value can be detected, for example.

When there is a touch operation straddling a plurality of regions, the touch operation is determined to be on one of any of these regions on the basis of the contact time for each region, and then the touch operation is interpreted. Therefore, if there is an operation followed by movement, such as a flick or a pinch-in/pinch-pout, then a suitable region can be identified from the contact time of each region even if a plurality of regions are straddled (contacted).

The touch operation is interpreted on the basis of the contact time at the time of touch operation and the comparison between the area of contact and the threshold. Thus, a momentary touch or the like can be recognized as an unintentional operation and a suitable control can be enabled, for example.

If the contact time during touch operation is greater than or equal to a prescribed time, then the CPU issues a command to execute various processes on the basis of whether the comparison of the region is greater than or equal to the threshold. Therefore, the user can select a desired process with ease by merely changing the contact time during touch operation and the contact time.

In the embodiment described above, at the time of touch operation on the control region (command indicator region) CA, if the area of contact is smaller than the threshold corresponding to the command indicator region but larger than the threshold corresponding to the whole region WH, then a command to execute a process corresponding to the whole region WH will be issued instead of a process corresponding to the command indicator region. However, if the area of contact at the time of touch operation on any region is smaller than the threshold of that region, then the CPU may issue a command to execute a function such as a help function to explain operating methods or a return function that returns the previous process, for example, as an additional process instead of the process corresponding to that region.

When a tap operation with a large area of contact is performed on the command indicator region, a process corresponding to that command indicator may be performed, and when a tap operation with a small area of contact is performed a help process may be performed, for example. This makes it possible to differentiate various processes by the method of touch operation (method of contact) on the command indicator region.

In the embodiment described above, if the contact time during touch operation is greater than or equal to a prescribed time, then the CPU issues a command to execute various processes on the basis of whether the comparison of the region is greater than or equal to the threshold. However, in the opposite situation, i.e., when the contact time is below a prescribed time, then the CPU may issue a command to execute various processes on the basis of whether the comparison of the region is greater than or equal to the threshold. This makes it possible to recognize a slow touch as an unintentional operation while differentiating various processes based on the operation method (contact method) during a fast touch operation, for example.

In the embodiment described above, one threshold corresponding to one region is set, but a plurality of threshold levels may be set as the threshold corresponding to one region, and the CPU may issue a command to execute various processes on the basis of comparisons for each of the plurality of threshold levels during comparison of the regions. A wide variety of processes can be differentiated by the operation method (contact method).

In the embodiment described above, the largest value is detected from a plurality of areas of contact from contact presence during touch operation initialization until contact absence during touch operation termination, and this largest value serves as the area of contact (optimal value) at the time of touch operation. However, the mean or the mode of this plurality of areas of contact may also be used to detect the optimal value.

In the embodiment described above, when there is a touch operation straddling a plurality of regions, the touch operation is determined to be on one of any of these regions on the basis of the contact time for each region, but the touch operation may be determined to be on any one of these regions on the basis of both the contact time and the area of contact.

In the embodiment described above, the control region (screen edge regions) CA, control region (command indicator region) CA, and whole region WH were shown as a plurality of regions on the touch screen, but without being limited thereto, the command indicator region may be divided between the respective buttons or icons, the entirety of the touch screen may be divided into an upper region and a lower region or may be divided into a right region and a left region. Furthermore, the entire touch screen may be divided into a plurality of regions corresponding to the display contents (text, images, or the like).

In the embodiment described above, a portable terminal device (smartphone) being used as the information processing device was shown as an example, but a tablet terminal device, a portable phone other than a smartphone, a personal computer, a PDA (personal portable information communication device), a digital camera, a music player, and the like may be used.

The "devices" and "units" or "areas" shown in the embodiment described above may be divided into a plurality of casings depending on the function thereof and are not limited to a single casing. The respective steps in the flow charts described above are not limited to chronological processes, and a plurality of steps may be processed in parallel or each may be processed independently.

The embodiment of the present invention was described above, but the present invention is not limited thereto, and encompasses the present invention stated in the claims and their equivalents.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. An information processing device, comprising:
   a touch screen having a touch panel attached thereto;
   a memory that stores a plurality of thresholds that are different from each other for detecting touch operations so as to provide for differing touch sensitivities in various regions on the touch screen; and
   a processor that defines a plurality of regions on the touch screen, and assigns said plurality of thresholds to the plurality of regions, respectively, in accordance with a content of an image displayed on the touch screen or an orientation of the touch screen, or both, so that touch sensitivities are mutually different among at least some of the plurality of regions,
   wherein the processor receives signals from the touch screen to detect a contact position and an area of contact when there is a touch operation on the touch screen,
   wherein the processor further identifies a region on the touch screen where the touch operation has occurred among said plurality of regions defined on the touch screen, on the basis of the detected contact position and compares the detected area of contact to one of said plurality of thresholds assigned to said identified region, the processor interpreting the touch operation on the basis of this comparison and controlling a process corresponding to the touch operation,
   wherein said plurality of regions defined on the touch screen includes an indicator display region that displays a command indicator; a screen edge region that is arranged on an edge of the touch screen; and a whole region that includes said indicator display region and said screen edge region as sub-regions therein, the threshold assigned to the whole region being smaller than the threshold assigned to the indicator display region, and the threshold assigned to the indicator display region being smaller than the threshold assigned to the screen edge region, wherein when the processor determines that the touch operation had occurred in the indicator display region, the processor executes a process corresponding to the command indicator if the area of contact of the touch operation is larger than the threshold assigned to the indicator display region, and if the area of contact of the touch operation is smaller than the threshold assigned to the indicator display region, the processor compares the area of the contact with the threshold assigned to the whole region, and executes a corresponding process if the area of the contact is greater than the threshold assigned to the whole region, wherein when the processor determines that the touch operation had occurred in the screen edge region, the processor compares the area of contact of the touch operation with the threshold assigned to the screen edge region, and if the area of contact is larger than the threshold assigned to the screen edge region, the processor determines that the touch operation is invalid, and if the area of contact is smaller than the threshold assigned to the screen edge region, the processor compares the area of the contact with the threshold assigned to the whole region, and executes a corresponding process if the area of the contact is greater than the threshold assigned to the whole region, and wherein the processor measures a contact time for each region on the touch screen when the processor identifies that a plurality of regions have been touched, wherein, when the processor identifies that a touch operation has straddled multiple regions among said plurality of regions defined by the processor, the processor interprets the touch operation by determining that said touch operation has contacted one of said multiple regions on the basis of the measured contact time for each of the multiple regions, and wherein, when the processor identifies that the touch operation has straddled the multiple regions among said plurality of regions defined by the processor, the processor interprets the touch operation by determining that said touch operation has contacted one of said multiple regions that had the longest contact time among the multiple regions.

2. The information processing device according to claim 1, wherein when the processor detects a plurality of areas of contact from contact presence during touch operation initialization until contact absence during touch operation termination, the processor determines an optimum value thereof on the basis of the plurality of areas of contact, the optimum value acting as the area of contact at the time of touch operation.

3. The information processing device according to claim 1, wherein the processor measures a contact time of the touch operation, and wherein the processor interprets the touch operation on the basis of the measured contact time and said comparison of the area of contact.

4. The information processing device according to claim 3, wherein, when the contact time measured is greater than or equal to a prescribed length of time, the processor executes various types of processes on the basis of whether or not the comparison of the area of contact is greater than or equal to the threshold.

5. The information processing device according to claim 3, wherein, when the contact time measured is below a prescribed length of time, the processor ignores the touch operation having said contact time as an unintentional operation.

6. The information processing device according to claim 1, wherein a plurality of threshold levels are assigned to each of said plurality of regions defined by the processor, and wherein the processor compares the area of contact with each of the plurality of threshold levels assigned to said identified region and issues a command to execute one of multiple processes on the basis of the comparison of the area of contact with each of the threshold levels.

7. A method of controlling a touch operation on a touch screen in an information processing device, executed by a processor in the information processing device, the information processing device further including a memory storing a plurality of thresholds that are different from each other for detecting touch operations so as to provide for differing touch sensitivities in various regions on the touch screen, the method comprising:

defining a plurality of regions on the touch screen, and assigning said plurality of thresholds to the plurality of regions, respectively, in accordance with a content of an image displayed on the touch screen or an orientation of the touch screen, or both, so that touch sensitivities are mutually different among at least some of the plurality of regions, detecting a contact position and an area of contact when there is a touch operation on the touch screen having a touch panel attached thereto;

identifying a region on the touch screen that has been touched among said plurality of regions defined on the touch screen on the basis of the contact position that has been detected;

comparing the detected area of contact to one of said plurality of thresholds assigned to said identified region; and interpreting the touch operation on the basis of said comparison of the area of contact and controlling a process corresponding to the touch operation, wherein said plurality of regions defined on the touch screen includes an indicator display region that displays a command indicator; a screen edge region that is arranged on an edge of the touch screen; and a whole region that includes said indicator display region and said screen edge region as sub-regions therein, the threshold assigned to the whole region being smaller than the threshold assigned to the indicator display region, and the threshold assigned to the indicator display region being smaller than the threshold assigned to the screen edge region, wherein the method includes, when the touch operation is determined to have occurred in the indicator display region, executing a process corresponding to the command indicator if the area of contact of the touch operation is larger than the threshold assigned to the indicator display region, and if the area of contact of the touch operation is smaller than the threshold assigned to the indicator display region, comparing the area of the contact with the threshold assigned to the whole region, and executing a corresponding process if the area of the contact is greater than the threshold assigned to the whole region, wherein the method includes, when the touch operation is determined to have occurred in the screen edge region, comparing the area of contact of the touch operation with the threshold assigned to the screen edge region, and if the area of contact is larger than the threshold assigned to the screen edge region, determining that the touch operation is invalid, and if the area of contact is smaller than the threshold assigned to the screen edge region, comparing the area of the contact with the threshold assigned to the whole region, and executing a corresponding process if the area of the contact is greater than the threshold assigned to the while region, wherein the method includes measuring a contact time for each region on the touch screen when a plurality of regions have been touched, wherein the method includes, when a touch operation has straddled multiple regions among said plurality of regions defined on the touch screen, interpreting the touch operation by determining that said touch operation has contacted one of said multiple regions on the basis of the measured contact time for each of the multiple regions, and wherein the method includes, when the touch operation has straddled the multiple regions among said plurality of regions defined on the touch screen, interpreting the touch operation by determining that said touch operation has contacted one of said multiple regions that had the longest contact time among the multiple regions.

8. The information processing device according to claim 1, wherein the processor defines said plurality of regions in accordance with a plurality of display elements contained in the image displayed on the touch screen.

9. The information processing device according to claim 1, wherein the processor updates and redefines said plurality of regions each time when the orientation of the touch screen is changed by a user.

* * * * *